United States Patent Office 3,114,477
Patented Dec. 17, 1963

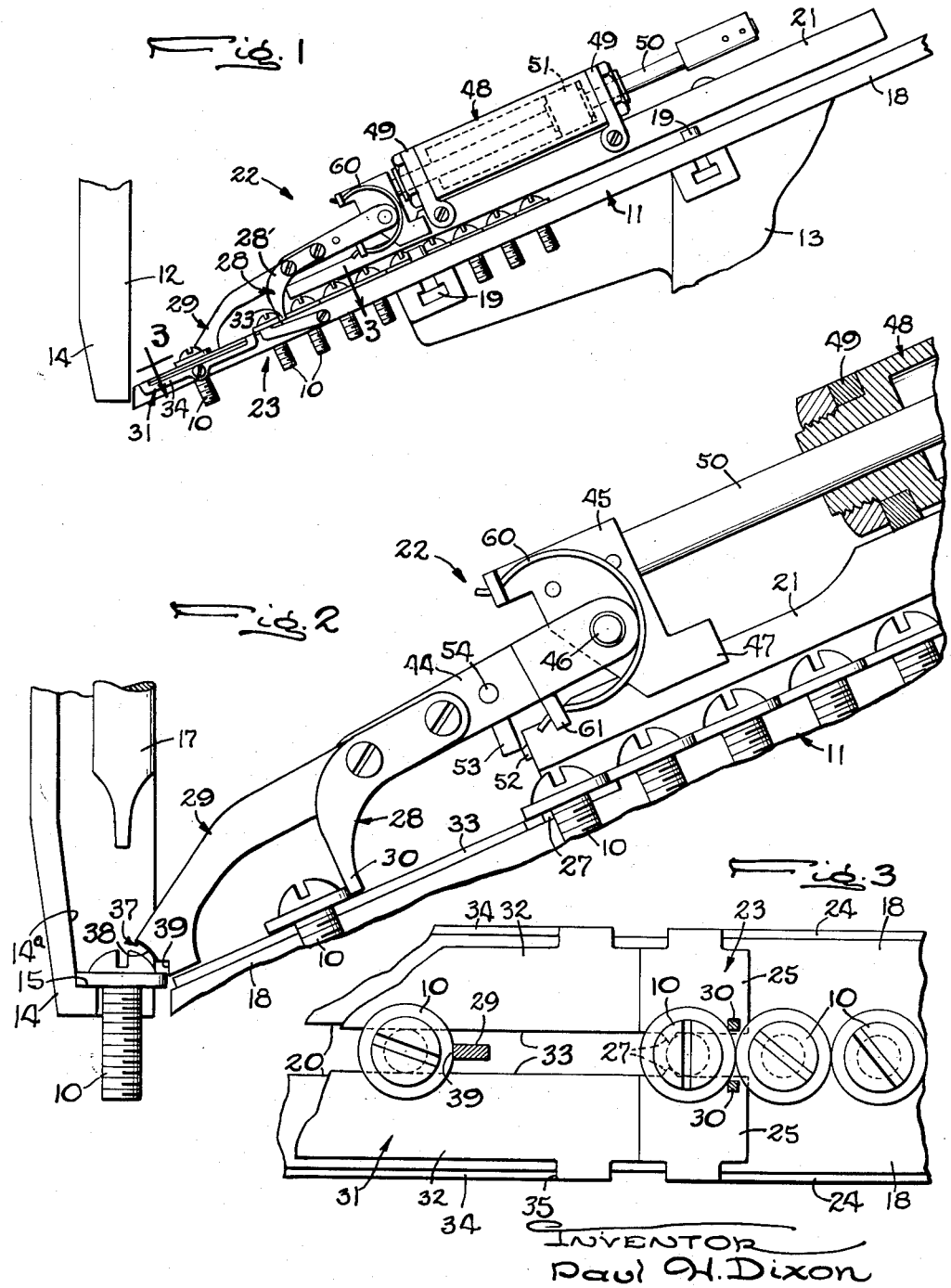

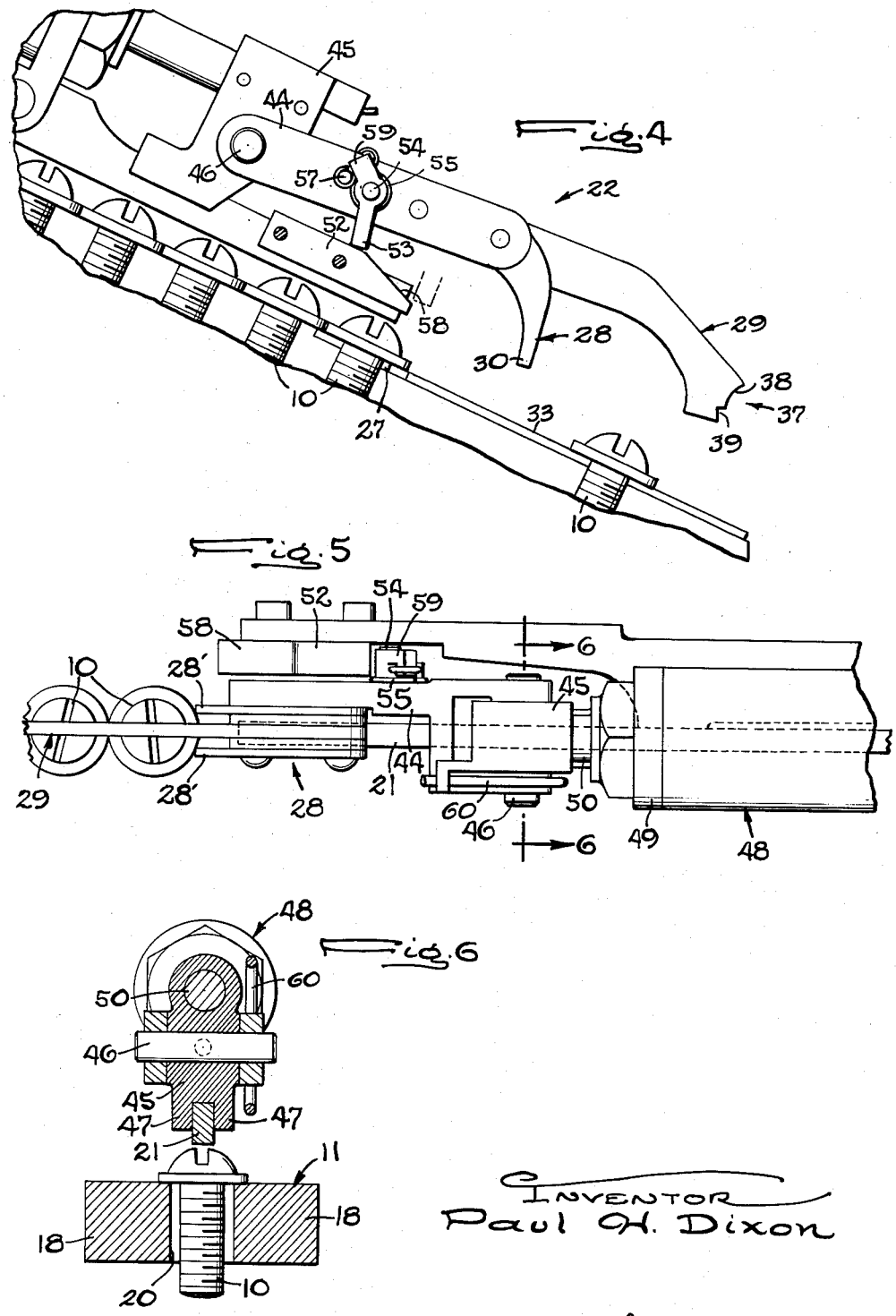

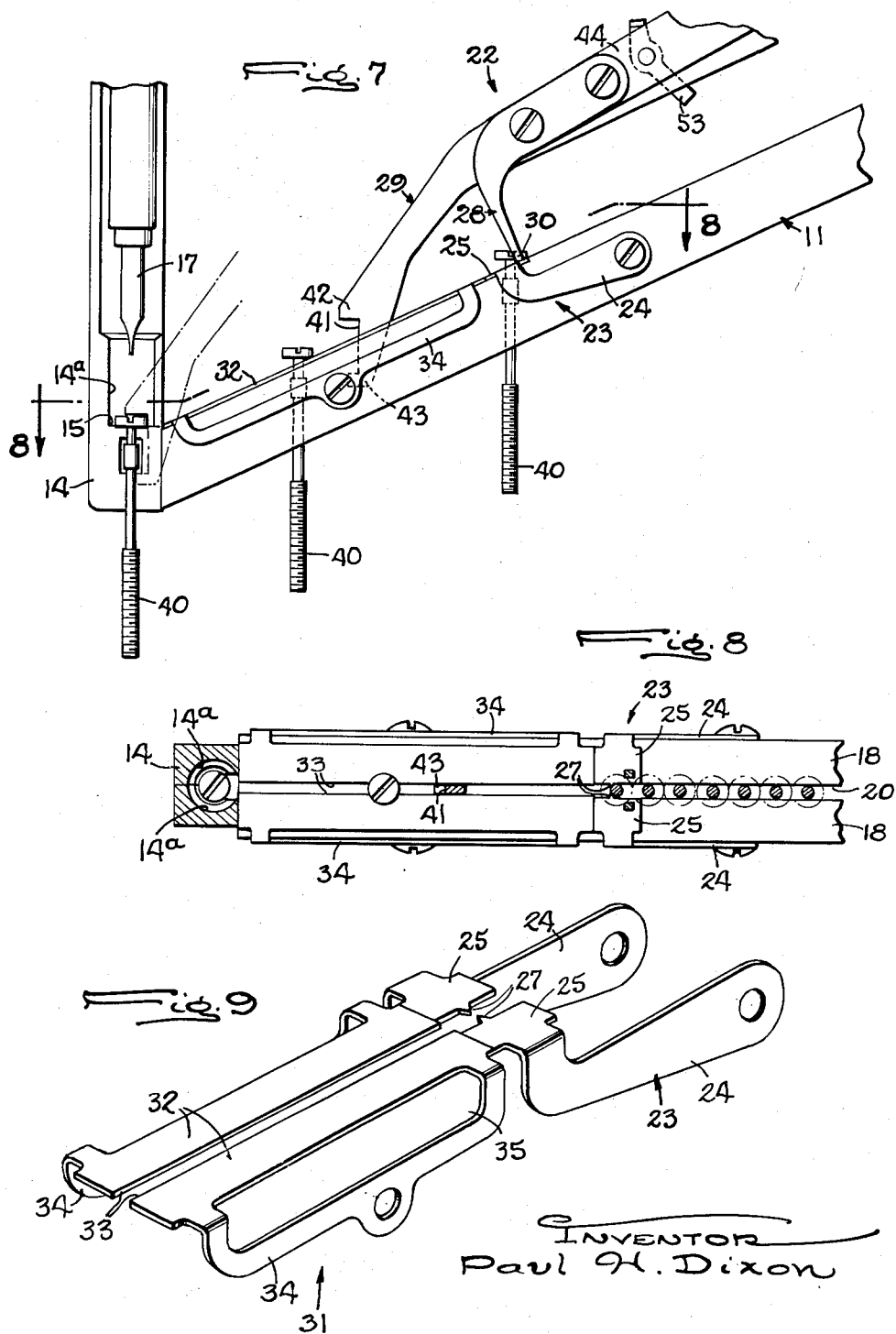

3,114,477
MECHANISM FOR HANDLING WORKPIECES
Paul H. Dixon, 741 N. Gardiner, Rockford, Ill.
Filed June 19, 1961, Ser. No. 118,045
9 Claims. (Cl. 221—238)

The invention relates to machine tools of the type in which workpieces such as screws, washers and the like are held in a work receiving element such as a chuck where they may be operated upon by a tool such as a punch or a power operated screwdriver. More particularly, the invention has reference to a machine tool in which the workpieces are advanced along a chute between a feeder and the chuck. In such an arrangement, a plurality of workpieces are disposed in abutting engagement in a row in the chute and are delivered one at a time to the chuck by an escapement mechanism which releases the terminal workpiece for feeding into the chuck while holding the remaining workpieces in the chute.

The general object of the present invention is to provide an escapement mechanism constructed and arranged in a novel manner so that successive workpieces in the closely spaced row are fed into and seated in the chuck in a high speed operation while at all times remaining under positive control of the mechanism.

A more specific object is first to separate the terminal workpiece from the closely spaced row in the chute and then to advance the work into and positively seat it in the chuck by means of a ram movable in behind the exposed trailing surface of the separated piece thereby to insure positive control of the work by the ram during the feeding stroke of the latter.

A further object is to provide a detent which holds the separated screw in a predetermined position along the chute for engagement with the ram and maintains the workpiece in contact with the ram during the feeding stroke of the latter thereby insuring positive control of the work at all times between separation from the row and seating in the chuck.

The invention also resides in the novel configuration of the ram for alining, inserting and seating the workpieces in the chuck.

Other objects and advantages of the invention will become apparent from the following detailed description taken in connection with the accompanying drawings, in which—

FIGURE 1 is a fragmentary elevational view of a machine tool incorporating the novel features of the present invention.

FIG. 2 is an enlarged fragmentary view similar to a part of FIG. 1 and showing a different position of the parts.

FIG. 3 is a fragmentary sectional view taken along the line 3—3 in FIG. 1.

FIG. 4 is an enlarged elevational view of the mechanism shown in FIG. 1 viewed from the opposite side and with the parts in different positions.

FIG. 5 is an enlarged fragmentary plan view of a part of FIG. 1.

FIG. 6 is a fragmentary sectional view taken along the line 6—6 in FIG. 5.

FIG. 7 is an enlarged view similar to FIG. 1 and showing a modified form of the invention.

FIG. 8 is a fragmentary sectional view taken along the line 8—8 in FIG. 7.

FIG. 9 is an enlarged perspective view of part of the escapement mechanism.

As shown in the drawings for purposes of illustration, the invention is embodied in a machine tool such as a power operated screwdriver in which successive screws 10 are delivered through a chute 11 to a work receiving element, herein a chuck 12 mounted on the lower end of a tool head (not shown). The head and the chute are mounted on a suitable support 13 (FIG. 1) which also supports a work table (not shown) for holding the parts into which the screws are to be threaded. As is usual in such cases, the chuck 12 is formed by two jaws 14 (see FIG. 8) which are pivotally supported on the head with their lower ends yieldably urged together.

As shown in FIGS. 2, 7 and 8, opposed notches 14a in the lower end portions of the jaws of the chuck cooperate to form an opening in the chuck at the end of the chute 11. Screws 10 are fed one at a time through this opening so that the head of the screw rests on a shoulder 15 (FIG. 2) when the jaws 14 are closed. In this instance, the screw heads are formed with flanges which lie against the shoulder. When a screw is held in this manner, the tool head is lowered toward the work table and a screw driving tool 17 is moved into engagement with the screw. The jaws subsequently may be swung apart to release the screw in a manner well known in the art.

Herein, the chute 11 is formed by two elongated and parallel bars 18 held on the support 13 as by bolts 19 (FIG. 1) and inclined downwardly toward the opening in the chuck so that screws advance by gravity toward the chuck. The screws slide in an upwardly opening longitudinal slot 20 defined by the adjacent sides of the bars, the latter being spaced apart a distance greater than the diameter of the screw shank but less than the diameter of the heads. The screws are disposed in the chute with their shanks projecting into the slot and their heads resting on top of the bars 18 on opposite sides of the slot. The top of the chute is covered by a plate 21 which is fastened to the bars 18 and terminates short of the chuck. Holding the closely spaced row of screws in the chute is an escapement mechanism 22 which releases the successive terminal screws one at a time and in timed relation with the raising and lowering of the head and feeds the released screw into the chuck each time the chuck is raised.

In the present instance, the row of screws 10 is held in the slot by a stop 23 which is part of the escapement mechanism 22 and is formed intermediate the ends of the chute. Preferably, this stop comprises a pair of resilient arms 24 bolted against opposite sides of the chute with the free ends 25 bent over the top of the chute to terminate adjacent the slot. Lugs 27 formed on the ends 25 extend partially across the slot from opposite sides to constitute a resiliently yieldable stop against which the terminal screw in the row abuts. By pressing the terminal screw against the lugs, the arms are bent outwardly and the lugs are opened to release the screw for insertion in the chuck. As one screw is pressed between the lugs, the next screw in the row slides against the lugs.

In accordance with the present invention, the escapement mechanism 22 is constructed and arranged in a novel manner so that successive workpieces 10 in the closely spaced row are fed into and securely seated in the chuck 12 in a high speed operation while at all times remaining under positive control of the mechanism. To achieve these ends, the mechanism 22 includes two fingers 28 and 29 spaced apart along the chute, one for engaging an exposed trailing surface of the terminal screw to separate the latter from the row and move it into a predetermined position along the chute, and another for ramming the separated workpiece into the chuck. Thus, the finger 28 exposes the full trailing side of each successive screw for engagement with the ram 29 and the latter may be moved freely into a position directly behind the screw and securely engages the then fully exposed trailing surface to ram the screw into the chuck.

Herein, the finger 28 comprises two generally L-shaped plates 28′ (see FIG. 5) mounted side-by-side above the chute with one end 30 of each plate extending toward and terminating adjacent the slot 20. The lower ends 30 of the plates taper toward the chute and are spaced a short distance apart to form prongs for fitting between the adjacent screws and engaging the terminal screw on each side of the point of contact between the heads (see FIG. 3). In separating the screws, the prongs slide along the bars 18 on opposite sides of the slot to press the terminal screw against the lugs 27 and thereby actuate the escapement. While this type of finger preferably is used in operating on headed workpieces where the heads are of circular cross-section with exposed trailing surfaces on each side of the point of contact, it should be apparent that the end of the finger may be adapted to engage exposed trailing surfaces on workpieces of various shapes.

Formed on the chute between the stop 23 and the chuck is a detent 31 for holding the separated screw in a predetermined position along the chute for engagement with the ramming finger 29. In the present instance, this detent 31 comprises a pair of guide elements formed by resilient plates 32 disposed on top of the chute with opposed side edges 33 spaced apart on opposite sides of the slot 20 to provide a guideway between the stop 23 and the chuck. Means is provided to urge the edges 33 together and against the shank of the separated screw thereby to hold the screw in the predetermined position on the chute. Herein, this means comprises resiliently flexible flanges 34 on the plates 32 bent over and bolted to the sides of the chute to position the plates partially over the slot. As shown in FIG. 9, a portion of the plate may be cut away as at 35 to increase the flexibility of the flanges 34. With this arrangement, the forward movement of the prongs 30 carries the terminal screw through the stop 23 and into a predetermined position in the detent 31, spreading the plates so that the edges 33 press against and frictionally grip the screw shank to hold the screw against further sliding along the chute. Thus, the separated screw is held with its entire trailing side exposed for contact with the ram 29.

Ramming of the separated screws into the chuck is accomplished by the second finger 29 which moves in behind each screw as it is held in the detent, engages the screw, turns it into alinement with the chuck, and positively seats it in the chuck with the screw head against the shoulder 15. For these purposes, the finger 29 is an elongated link which projects along and above the slot 20 and curves downwardly adjacent its forward end to terminate in a ramming surface 37 disposed in advance of the finger 28 and shaped and oriented to aline the workpiece with the chuck. In the embodiment shown in FIGS. 1 through 4, this surface 37 is cut out to complement the contour of the screw head when the latter is seated in the chuck (see FIG. 2), with an arcuate surface 38 adapted to extend partially over the head and a lower notch 39 formed by walls adapted to lie over and alongside the flange around the head. Thus, as the finger 29 engages the separated screw in the detent 31 to push the screw along the guideway and into the chuck, the portion of the ramming surface 37 adjacent the chute presses the screw laterally into the chuck where the arcuate portion 38 of the ramming surface presses the head downwardly and securely against the shoulder 15, as shown in FIG. 2. Preferably, the chute ends at or slightly above the level of the shoulder so that the inclined feeding stroke of the finger 29 terminates with the screw head against the shoulder.

Shown in FIG. 7 is another embodiment of the invention illustrating the adaptability of the finger 29 to the feeding of various types and shapes of workpieces. When elongated parts such as the screws 40 are being fed into the chuck, it is desirable to engage the part at spaced points along its length in order to prevent it from swinging out of the vertical position as it is rammed into the chuck, even though no turning may be needed initially to aline the piece with the chuck. The free end of the finger shown in FIG. 7 is formed with a notch opening toward the screw 40 with a bottom wall 41 paralleling the axis of the chuck so that a lip 42 extends over the screw head and a lug 43 abuts against the shank substantially below the head. At the beginning of the forward stroke of the finger 29, the lug end 43 moves into the slot 20 behind the separated screw and then forwardly along the slot. The bottom 41 of the notch abuts against the head and the lug contacts the shank to slide the screw along the guideway and into the chuck. Further, the lip 42 presses downwardly against the top of the head to seat the screw securely against the shoulder 15.

It will be seen from the foregoing that the detent 31 frictionally prevents free sliding of successive workpieces between the stop 23 and the chuck thereby maintaining the workpiece in contact with the ram during the entire feeding stroke of the latter. Therefore, the detent contributes materially to the positive control of workpieces during high speed operations in which the approach velocity of the fingers 28 and 29 and the resulting impacts with the screws tend to knock the latter out of the desired entry position or even out of the slot.

For simplicity of construction and operation, both fingers 28 and 29 are mounted on a single supporting member which preferably comprises an elongated arm 44 disposed above and generally paralleling the chute 11 with its trailing end pivotally joined at 46 to a post 45 upstanding from the chute behind the stop 23. The underside of the post 45 is slotted to form depending legs 47 (FIG. 6) which straddle the cover plate 21 and support the post for sliding back and forth thereon.

To move the fingers back and forth along the chute, a double-acting air cylinder 48 is disposed above the chute and generally parallels the latter. The cylinder is secured on top of the cover plate 21 as by straps 49 with the rod 50 of the piston 51 projecting forwardly and fastened to the trailing side of the post 45 so that the latter is slid back and forth along the plate 21 upon sliding of the piston in the cylinder. Such sliding of the post projects and retracts the fingers.

Means is provided to lift the fingers away from the chute during the return stroke of the piston and drop them in place behind the workpieces to be moved during the next stroke of the piston. Herein, this means comprises a cam 52 (FIG. 4) secured to the side of the cover plate and coacting with a follower 53 depending from the arm 44 to lift the latter as the fingers are retracted. As shown in FIG. 4, the follower 53 is formed by the end of a leg pivotally supported on a pin 54 on the arm and urged into a generally vertical position by a spring 55 acting between the leg and a second pin 57 projecting from the side of the arm 44. As the arm moves away from the chuck, the follower is drawn up an inclined rise 58 on the cam 52 to tilt the arm about its pivot 46 and raise the fingers above the chute, a lug 59 rigid with the leg 53 abutting against the pin 57 to prevent turning of the leg around the pin 54. Near the end of the stroke, the follower drops in behind the cam to permit the arm to drop toward the chute and carry the fingers downwardly and behind the respective screws. For this purpose, a C-shaped spring 60 fast at one end on the post 45 and at the other end on a lug 61 rigid with the arm 44 urges the latter toward the chute. Then, as the arm again is moved toward the chuck, the follower contacts the end of the cam and swings rearwardly around the pin 54 to pass over the cam. During such swinging, the spring 55 is loaded to return the follower to its vertical position.

From the foregoing, it will be apparent that the mechanism 22 insures rapid and trouble free feeding of workpieces into the chuck. By using one finger to separate the workpieces and a second finger to ram the separated piece into the chuck, the ram may be shaped and positioned to insure positive control of the workpiece. Further, at all points between the stop 23 and the shoulder 15 in the chuck, the detent 31 maintains firm contact between the ram and the workpiece thus insuring the proper alinement, movement and seating of the workpiece.

I claim as my invention:

1. In a machine tool for operating on elongated workpieces having a head at one end, the combination of, a support, an element mounted on said support and having a lateral opening for receiving workpieces, an elongated chute inclined downwardly toward and terminating at said opening and formed with an upwardly opening longitudinal slot for supporting a row of workpieces with heads resting on said chute in abutting engagement, said heads having exposed trailing surfaces on opposite sides of a point of contact with the adjacent workpiece, a seat in said element slightly below the end of said chute, a stop intermediate the ends of said chute and engaging the terminal workpiece in said row, a detent formed on said chute between said stop and said element and terminating adjacent said opening, a member mounted to reciprocate longitudinally of said chute toward and away from said element, a first finger supported by said member to extend toward and terminate adjacent said chute, said first finger having spaced prongs for engaging said trailing surfaces to open said stop and advance the workpiece into said detent as said member moves toward said element, and a second finger supported by said member to project into said slot in advance of said first finger, the projecting end of said second finger being formed with ramming surfaces for extending partially over said heads and engaging spaced points along the length of said workpieces to aline the workpieces with said element and ram the workpieces both laterally and downwardly into the element and against said seat.

2. In a machine tool for operating on elongated workpieces having a head at one end, the combination of, a support, an element mounted on said support and having a lateral opening for receiving workpieces, an elongated chute inclined downwardly toward and terminating at said opening and formed with an upwardly opening longitudinal slot for supporting a row of workpieces with heads resting on said chute in abutting engagement, said heads having exposed trailing surfaces on opposite sides of a point of contact with the adjacent workpiece, a seat in said element slightly below the end of said chute, a stop intermediate the ends of said chute and engaging the terminal workpiece in said row, a detent formed on said chute between said stop and said element and terminating adjacent said opening, a member mounted to reciprocate longitudinally of said chute toward and away from said element, a first finger supported by said member to extend toward and terminate adjacent said chute, said first finger having spaced prongs for engaging said trailing surfaces to open said stop and advance the workpiece into said detent as said member moves toward said element, and a second finger supported by said member to project into said slot in advance of said first finger, said second finger being movable with said first finger to engage a workpiece in said detent and ram the same through said opening and into said element.

3. In a machine tool for operating on elongated workpieces having a head at one end, the combination of, a support, an element mounted on said support and having a lateral opening for receiving workpieces, an elongated chute inclined downwardly toward and terminating at said opening and formed with an upwardly opening longitudinal slot for supporting a row of workpieces with heads resting on said chute in abutting engagement, said heads having exposed trailing surfaces on opposite sides of a point of contact with the adjacent workpiece, a seat in said element slightly below the end of said chute, a stop intermediate the ends of said chute and engaging the terminal workpiece in said row, a detent formed on said chute between said stop and said element and terminating adjacent said opening, a member mounted to reciprocate longitudinally of said chute toward and away from said element, a first finger supported by said member to extend toward and terminate adjacent said chute and having a leading edge for engaging said trailing surfaces to separate said workpiece from said row and advance the workpiece into said detent as said member moves toward said element, and a second finger supported by said member to project into said slot in advance of said first finger, the projecting end of said second finger being formed with ramming surfaces for extending partially over said heads and engaging spaced points along the length of said workpieces to aline the workpieces with said element and ram the workpieces both laterally and downwardly into the element and against said seat.

4. In a machine tool for operating on workpieces having a head at one end, the combination of, a support, an element mounted on said support and having a lateral opening for receiving workpieces, an elongated chute inclined downwardly toward and terminating at said opening and formed with an upwardly opening longitudinal slot for supporting a row of workpieces with heads resting on said chute in abutting engagement, said heads having exposed trailing surfaces on opposite sides of a point of contact with the adjacent workpiece, a seat in said element slightly below the end of said chute, a stop intermediate the ends of said chute and engaging the terminal workpiece in said row, a detent formed on said chute between said stop and said element and terminating adjacent said opening, a member mounted to reciprocate longitudinally of said chute toward and away from said element, a first finger supported by said member to extend toward and terminate adjacent said chute, said first finger having spaced prongs for engaging said trailing surfaces to open said stop and advance the workpiece into said detent as said member moves toward said element, and a second finger supported by said member to extend toward and terminate adjacent said chute in advance of said first finger, the leading end of said second finger being formed with ramming surfaces extending partially over said heads and complemental to the contour of the heads when the latter are disposed in said seat to aline said workpieces with said element and ram the workpieces both laterally and downwardly into the element and against said seat.

5. In a machine tool for operating on workpieces having a head at one end, the combination of, a support, an element mounted on said support and having a lateral opening for receiving workpieces, an elongated chute inclined downwardly toward and terminating at said opening and formed with an upwardly opening longitudinal slot for supporting a row of workpieces with heads resting on said chute in abutting engagement, said heads having an exposed trailing surface, a seat in said element slightly below the end of said chute, a stop intermediate the ends of said chute and engaging the terminal workpiece in said row, a detent formed on said chute between said stop and said element and terminating adjacent said opening, a member mounted to reciprocate longitudinally of said chute toward and away from said element, a first finger supported by said member to extend toward and terminate adjacent said chute, said first finger having a leading edge for engaging said trailing surface to open said stop and advance the workpiece into said detent as said member moves toward said element, and a second finger supported by said member to extend toward and terminate adjacent said element in advance of said first finger, the leading end of said second finger being formed with ramming surfaces extending partially over said heads and complemental to the contour of the heads when the latter are disposed in said seat to aline said workpieces with said element and ram the workpieces both laterally and downwardly into the element and against said seat.

6. In a machine tool for operating on workpieces, the combination of, a support, a work receiving element mounted on said support and having a lateral opening for receiving workpieces, an elongated chute terminating at said opening and supporting a row of workpieces in abutting engagement, a stop intermediate the ends of said chute and engaging the terminal workpiece in said row, said terminal workpiece having an exposed trailing surface, a detent on said chute between said stop and said work receiving element formed by guide elements secured to the chute and having opposed surfaces spaced apart and extending along said chute to form an elongated guideway between said stop and said work receiving element, said guideway terminating adjacent said opening, means yieldably urging said surfaces together and against opposite sides of a workpiece to frictionally grip the workpiece in said detent, a member mounted to reciprocate longitudinally of said chute toward and away from said work receiving element, a first finger supported by said member to extend toward and terminate adjacent said chute, said first finger engaging said trailing surface to separate said terminal workpiece from said row and advance the workpiece into a predetermined position along said guideway as said member moves toward said work receiving element, and a second finger supported by said member to terminate adjacent said chute in advance of said first finger, said second finger moving in behind and engaging a workpiece in said predetermined position to ram the same through said opening and into said work receiving element.

7. The combination as defined in claim 6 in which said guide elements comprise resilient plates disposed on top of said chute with adjacent edges spaced apart over and along the chute.

8. The combination as defined in claim 7 in which said yieldable means comprises resiliently flexible flanges on said plates extending over the sides of said chute and fastened thereto.

9. In a machine tool for operating on workpieces, the combination of, a support, an element mounted on said support and having a lateral opening for receiving workpieces, an elongated chute terminating at said opening and supporting a row of workpieces in abutting engagement, a stop intermediate the ends of said chute and engaging the terminal workpieces in said row, said terminal workpiece having an exposed trailing surface, a detent formed on said chute between said stop and said element and terminating adjacent said opening, a member mounted to reciprocate longitudinally of said chute toward and away from said element, said member reciprocating through a stroke of predetermined length, a first finger supported by said member to extend toward and terminate adjacent said chute and having a leading edge for engaging said trailing surface to separate said workpiece from said row and advance the workpiece into said detent as said member moves toward said element, and a second finger supported by said member to terminate adjacent said chute in advance of said first finger and being movable with said first finger, said second finger having a leading edge spaced from the leading edge on said first finger by a distance less than said predetermined length to engage a workpiece in said detent and ram the same through said opening and into said element.

References Cited in the file of this patent
UNITED STATES PATENTS

| | | |
|---|---|---|
| 1,333,414 | Havener | Mar. 9, 1920 |
| 2,768,594 | Troll | Oct. 30, 1956 |